US007429915B2

(12) United States Patent
Cruzado et al.

(10) Patent No.: US 7,429,915 B2
(45) Date of Patent: Sep. 30, 2008

(54) SYSTEM AND METHOD FOR DETECTING UNAUTHORIZED ACCESS TO ELECTRONIC EQUIPMENT OR COMPONENTS

(75) Inventors: Edwin D. Cruzado, Plant City, FL (US); Kenneth H. Heffner, Key Largo, FL (US)

(73) Assignee: Honeywell International Inc., Morristown, NJ (US)

(*) Notice: Subject to any disclaimer, the term of this patent is extended or adjusted under 35 U.S.C. 154(b) by 36 days.

(21) Appl. No.: 11/170,881

(22) Filed: Jun. 30, 2005

(65) Prior Publication Data

US 2007/0109122 A1 May 17, 2007

Related U.S. Application Data

(60) Provisional application No. 60/673,187, filed on Apr. 20, 2005.

(51) Int. Cl.
*B60R 25/10* (2006.01)

(52) U.S. Cl. .................. 340/426.36; 340/550; 340/551; 340/555; 340/590; 340/652

(58) Field of Classification Search ............ 340/426.36, 340/550, 551, 555, 590, 652
See application file for complete search history.

(56) References Cited

U.S. PATENT DOCUMENTS

| | | | | |
|---|---|---|---|---|
| 3,763,795 | A * | 10/1973 | Wetz, Jr. | 109/24 |
| 5,117,457 | A | 5/1992 | Comerford et al. | |
| 5,468,990 | A | 11/1995 | Daum | |
| 5,568,124 | A | 10/1996 | Joyce et al. | |
| 5,762,711 | A | 6/1998 | Heffner et al. | |
| 5,821,582 | A | 10/1998 | Daum | |
| 5,877,093 | A | 3/1999 | Heffner et al. | |
| 6,110,537 | A | 8/2000 | Heffner et al. | |
| 6,215,397 | B1 * | 4/2001 | Lindskog | 340/550 |
| 6,287,985 | B1 | 9/2001 | Heffner et al. | |

(Continued)

FOREIGN PATENT DOCUMENTS

| | | | |
|---|---|---|---|
| DE | 100 65 747 | A | 7/2002 |

(Continued)

*Primary Examiner*—Tai Nguyen
(74) *Attorney, Agent, or Firm*—McDonnell Boehnen Hulbert & Berghoff LLP

(57) ABSTRACT

An improved system and method for protecting sensitive electronic equipment or components against unauthorized access, by detecting and also reacting to unauthorized intrusions into the enclosures for the sensitive electronic equipment or components is disclosed. For example, a protective system for protecting sensitive electronic equipment or components against unauthorized access is disclosed that includes a fiber optic cable mesh or network attached to, or embedded in, the walls of the enclosure for the electronic equipment or components. A continuous signal or burst is applied to the fiber optic cable, which is coupled to an optical signal detection device. Thus, any attempt to remove or penetrate the walls of the enclosure interrupts the signal in the fiber optic cable, and the interruption of the signal is detected by the optical signal detection device. In response to the detection of the interruption of the signal in the fiber optic cable, a process can be initiated to erase, destroy or alter sensitive data contained within the electronic equipment or components. Also, a power source for the protective system is disclosed, which can be self-sustaining and contained within the protected enclosure for the sensitive electronic equipment or components.

20 Claims, 4 Drawing Sheets

U.S. PATENT DOCUMENTS

| | | | | |
|---|---|---|---|---|
| 6,319,740 | B1 | 11/2001 | Heffner et al. | |
| 6,400,268 | B1 | 6/2002 | Lindskog | |
| 6,995,669 | B2 * | 2/2006 | Morales | 340/539.31 |
| 2003/0014643 | A1 | 1/2003 | Asami et al. | |

FOREIGN PATENT DOCUMENTS

| | | | |
|---|---|---|---|
| EP | 0972635 | A | 1/2000 |
| EP | 1045352 | A1 | 10/2000 |
| WO | 9502742 | | 1/1995 |
| WO | 0123980 | | 4/2001 |

* cited by examiner

SYSTEM AND METHOD FOR DETECTING UNAUTHORIZED ACCESS TO ELECTRONIC EQUIPMENT OR COMPONENTS

GOVERNMENT LICENSE RIGHTS

The U.S. Government may have certain rights in the present invention as provided for by the terms of Contract No. FA8650-04-C-8011 awarded by the U.S. Department of the Air Force.

This application claims the benefit of U.S. Provisional Application No. 60/673,187, filed on Apr. 20, 2005, which is incorporated herein by reference in its entirety.

FIELD OF THE INVENTION

The present invention relates generally to the protection of electronic equipment or components against unauthorized access, and more specifically, but not exclusively, to an improved system and method for detecting and reacting to unauthorized intrusions into enclosures for sensitive electronic equipment or components.

BACKGROUND OF THE INVENTION

The need to protect sensitive electronic equipment or components against unauthorized access is well known. For example, electronic systems or components used for civilian applications can contain sensitive, proprietary information that needs to be protected against unauthorized access. For example, financial institutions and corporations use computerized systems to protect sensitive information (e.g., personal data, customer data, financial data, financial transaction authorization codes, authentication procedures, security passwords, etc.). Such sensitive information may be stored in alterable semiconductor memory devices (e.g., flash memory device, EPROM, EEPROM, PROM, RAM, DRAM, etc.) or memory components of integrated circuits. Any compromise in the security of the sensitive data contained in such memory devices or integrated circuits can result in significant tangible and intangible losses to the financial institutions and corporations, such as, for example, financial losses, losses due to fraudulent transactions, business losses, losses due to compromised customer lists and financial data, losses of institutional or corporate integrity, losses of commercial confidence, and losses due to adverse publicity. Thus, electronic systems or components containing sensitive information used for civilian applications need to be protected against unauthorized access.

Intruders may attempt to gain unauthorized access to sensitive information or structures in electronic equipment or components by physically accessing the electronic equipment or components involved. For example, an intruder may attempt to gain access to sensitive electronic equipment by opening or removing a wall of the enclosure (e.g., chassis wall) for the electronic equipment, or gain access to sensitive data in an electronic component (e.g., flash memory, integrated circuit, etc.) by creating a portal through or removing the encapsulant surrounding the component or assembly in order to expose the interconnect and/or address busses in the component. If such attempted intrusions are successful, the intruders can observe and learn about the sensitive features in the electronic equipment, or reverse engineer the electronic components in order to access the sensitive data via the exposed interconnect and/or address busses in order to learn about and/or compromise the operations of the components or associated systems. Therefore, given the substantive, continuing need to protect such sensitive electronic equipment or components (and any sensitive data contained therein) against unauthorized access, and the need to render useless the sensitive data that might be obtained by such successful unauthorized intrusions, it would be advantageous to provide a system and method for enhancing the protection of sensitive electronic equipment or components against unauthorized access, that can detect and also respond to unauthorized intrusions into the enclosures for the sensitive electronic equipment or components. As described in detail below, the present invention provides such a system and method.

SUMMARY OF THE INVENTION

The present invention provides an improved system and method for protecting sensitive electronic equipment or components against unauthorized access, by detecting and also reacting to unauthorized intrusions into the enclosures for the sensitive electronic equipment or components. In accordance with a preferred embodiment of the present invention, a protective system for protecting sensitive electronic equipment or components against unauthorized access is provided that includes an optical fiber mesh or network attached to, or embedded in, the walls of the enclosure for the electronic equipment or components. A continuous signal or burst is applied to the optical fiber core, which is coupled to an optical signal detection device. Thus, an action to remove the enclosure walls or access the contents through a portal in the wall of the enclosure interrupts or diminishes the optical signal (dB) in the optical fiber, and the interruption of the signal is detected by the optical signal detection device. In response to the detection of the interruption of the signal in the optical fiber, a process can be initiated to erase, destroy or alter sensitive data contained within the electronic equipment or components. Also, in accordance with the present invention, a power source for the protective system is provided, which can be self-sustaining and contained within the protected enclosure for the sensitive electronic equipment or components.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
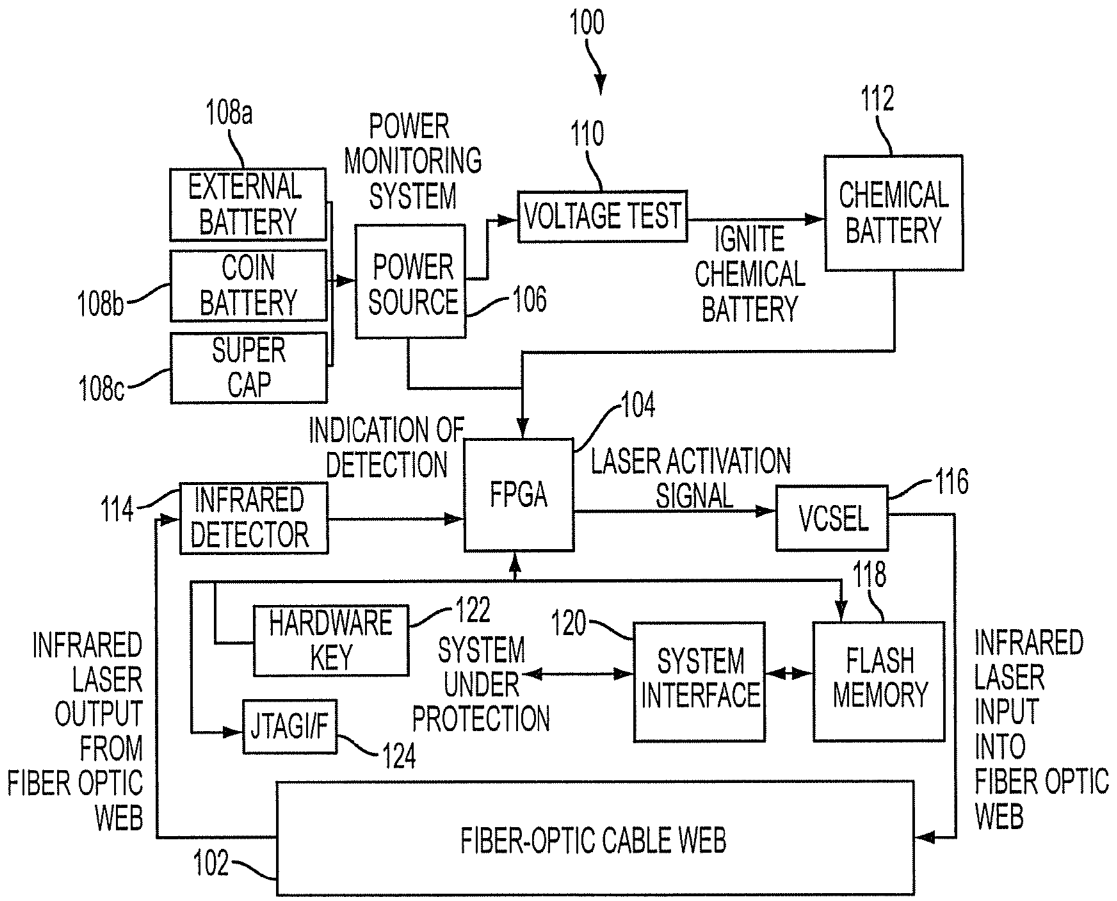
FIG. 1 depicts a block diagram of an example system for protecting sensitive electronic equipment or components against unauthorized access, which can be used to implement one or more embodiments of the present invention.

With reference now to the figures, FIG. 1 depicts a block diagram of an example protective system 100 for protecting sensitive electronic equipment or components against unauthorized access, which can be used to implement one or more embodiments of the present invention. For this example embodiment, which is described herein for illustrative purposes and not intended to limit the breadth or scope of the present invention, system 100 includes a fiber optic web 102 embedded in a wall of an enclosure for an electronic system or component. Fiber optic web 102 includes at least one fiber optic conductor arranged in a coiled or winding pattern that is parallel to the wall of the enclosure. For example, if such an enclosure forms a box with six walls that surround an electronic system or component, a plurality of fiber optic webs 102 (e.g., six) may be used. Thus, in that case, an intrusion into the enclosure for the electronic system or component would penetrate at least one of the six fiber optic webs 102 used. As such, a more detailed description of an example fiber optic web arrangement that may be used to implement fiber optic web 102 is described below with respect to FIG. 2.

For this example embodiment, system 100 also includes a logic device 104 coupled to fiber optic web 102 via an optoelectronic signal generator 116 connected to an input of fiber optic web 102, and via an optical signal detector 114 connected to an output of fiber optic web 102. As shown, logic device 104 generates a signal that activates optoelectronic signal generator 116, which outputs an optical signal (e.g., in the infrared, ultraviolet, and visible spectra range) to the input of fiber optic web 102. The generated optical signal can be a continuous signal or a pulsed signal (e.g., burst) for use in a lower power operating mode. The optical signal at the input of fiber optic web 102 is coupled through the conductor(s) of fiber optic web 102 and then to the input of optical signal detector 114. In response, optical signal detector 114 converts the detected optical signal to an electrical signal that can be filtered or digitized, and outputs a suitable signal indicating a detection of a continuous or pulsing optical signal to the input of logic device 104. However, if the optical signal being coupled through fiber optic web 102 is interrupted, then the optical signal detector 114 does not output a detection indication signal to logic device 104. Thus, for this example, if logic device 104 instructs a signal to activate optoelectronic signal generator 116, but receives no detection indication signal from optical signal detector 114, then logic device 104 (e.g., executing a suitable algorithm implemented in software) may assume that the conductive path for the optical signal through fiber optic web 102 has been interrupted. In this manner, logic device 104 functions to monitor the optical signal through fiber optic web 102, and, thereby, the physical integrity of the associated enclosure. Notably, the detection of a pulsing optical signal can be accomplished by verifying the time interval between pulses and/or the persistence of each individual pulse. This function of evaluating the pulses can be accomplished within logic device 104.

Notably, for this example embodiment, logic device 104 may be implemented with a programmable logic device, such as, for example, a Field-Programmable Grid Array (FPGA), or an Application-Specific Integrated Circuit (ASIC) designed to function as a programmable logic device. Also, logic device 104 may be implemented with a microcontroller, or a suitable non-reprogrammable logic device. Additionally, optoelectronic signal generator 116 may be implemented with a Vertical-Cavity Surface Emitting Laser (VCSEL), any other suitable laser transmitter device, or light-emitting diode. As such, if optoelectronic signal generator 116 is implemented with a laser device (or light-emitting diodes) operating, for example, in the infrared frequency range, then optical signal detector 114 may be implemented with a suitable infrared detector (or, for example, a photodiode). Additionally, for other embodiments, optoelectronic signal generator 116 and optical signal detector 114 may be implemented with suitable devices operating in the ultraviolet or visible spectral wavelength ranges.

For this example embodiment, system 100 also includes an alterable memory device 118, which is coupled to an output of logic device 104 and an interface 120 for a system or component under the protection of system 100. For this example, alterable memory device 118 may be implemented with a flash memory or other suitable programmable memory device (e.g., EPROM, EEPROM, SRAM, etc.) capable of storing sensitive data associated with the operations of the system or component under the protection of system 100. Consequently, for example, if logic device 104 determines that the conductive path for the optical signal through fiber optic web 102 has been interrupted, then logic device can output a suitable signal to alterable memory device 118, which causes alterable memory device 118 to erase, overwrite, modify or destroy the sensitive data associated with the operations of the system or component and, thereby, prohibit the use, reverse engineering, or other compromise of the system or component by an unauthorized intruder.

For this example, system 100 can also include a security key interface 122 coupled to an input of logic device 104, and a Joint Test Action Group (JTAG) interface 124 coupled to an output of logic device 104. A security key can be used by an authorized person to identify an intrusion detection mode for logic device 104 that may or may not cause the destruction of the data stored in alterable memory device 118. A JTAG interface may be used to provide a conventional test access port and/or boundary scan for debugging embedded systems or testing integrated circuits in accordance with the JTAG test protocol. In any event, the security key interface and JTAG interface are shown in FIG. 1 for illustrative purposes only, and more detailed descriptions of these components may be found in other literature.

For this example embodiment, system 100 also includes a power monitoring system 106 that can detect a loss of power to system 100. For example, power for system 100 can be provided by an external battery **108*a* (e.g., located external to system 100), an internal battery 108*b* (e.g., a coin-type, Lithium battery), and a super capacitor 108*c*. A super capacitor is a very low leakage capacitor, which can be charged by the external battery 108*a* and is capable of holding a charge for approximately one year. Super capacitor 108*c* can be used to provide a current to activate a chemical battery (e.g., thermal battery) 112, which provides power to the circuit with logic device 104 and alterable memory device 118 in the event that the internal or external battery power level moves below a predetermined threshold value. An interface between the external battery 108*a* and system 100 provides protection against shorting of the internal power applied to system 100, protection against power surges, and protection against polarity reversal of the poles of external battery 108*a*. Also, the internal battery 108*b* can provide power to system 100 for the short term, for example, while the external battery 108*a*** is disconnected, and also until a decision is made about whether or not to initiate a process to erase, destroy, or alter the data of the system under protection.

For this example embodiment, external battery **108*a* includes a sentry/health monitor Light Emitting Diode (LED), and a security key that identifies external battery 108*a*** as an authorized device when external battery 108*a* is connected to system 100. The sentry monitor LED can display text or numbers identifying attempts to access the protected enclosure, and the health monitor (e.g., voltage test unit 110) can identify the charge state of the internal battery 108*b*. If external battery 108*a* is disconnected from system 100, an internal timer can begin a count down for a predetermined period. If no valid security key is provided to system 100 during the predetermined period, then the super capacitor is discharged (via voltage test unit 110) to cause an ignition of chemical battery 112 and the destruction of data stored in alterable memory device 118.

Figure 2:
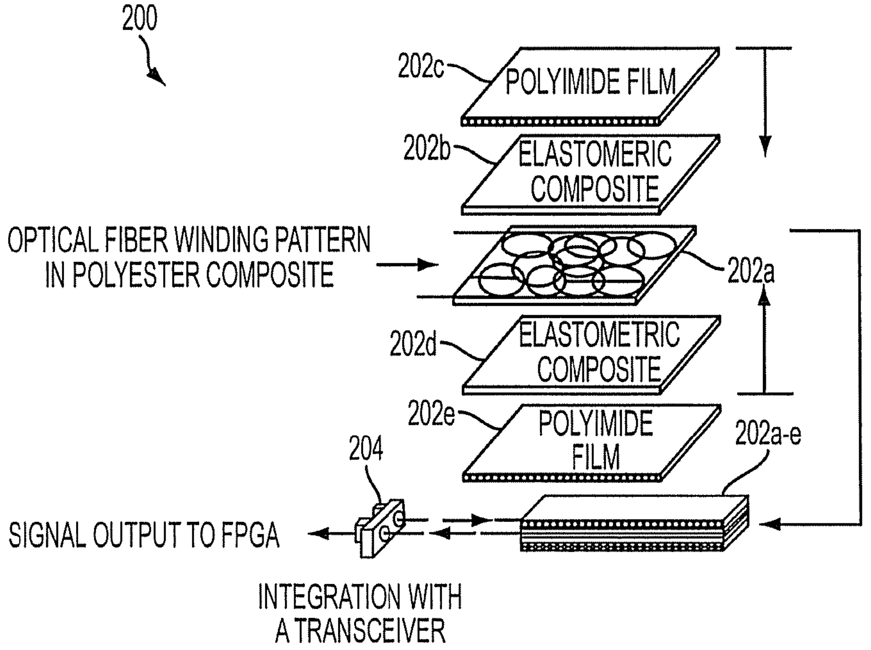
FIG. 2 depicts a pictorial representation of a cutaway, perspective view of an example fiber optic web, which can be used to implement fiber optic web 102 of the example embodiment shown in FIG. 1.

FIG. 2 depicts a pictorial representation of a cutaway, perspective view of an example fiber optic web 200, which can be used to implement fiber optic web 102 of the example embodiment shown in FIG. 1. For this example, fiber optic web 200 includes a first layer 202*a* with an optical fiber conductor arranged in a coiled or winding pattern and formed within (for example) a suitable polyester composite material. The optical fiber conductor can be, for example, a single fiber optic stand, a plurality of fibers twisted together for redundancy, or an optical array of light emitting devices. The winding or coiled fiber conductor is arranged in a sufficiently dense coverage pattern so as to ensure that the conductor will be disturbed or broken by a penetration or destruction of a portion of layer 202*a*. A second layer 202*b* formed of a suitable elastomeric composite material is disposed on one surface of first layer 202*a*, and a third layer 202*d* of the elastomeric composite material is disposed on the opposite surface of first layer 202*a*. A fourth layer 202*c* of a suitable polyimide (or similar rigid/semi-rigid resin) film material is disposed on the outer surface of second layer 202*b*, and a fifth layer 202*e* of the polyimide film material is disposed on the outer surface of third layer 202*d*. Other materials can be used for the fifth layer as well, such as, for example, Beryllium, Beryllium-Copper, Aluminum alloy, Tantalum alloy, Tungsten alloy, Stainless steel, Titanium alloy, Galvanized Aluminum and Stainless steel, nickel-plated copper, and other similar metallic materials. The metal materials may be bulk (e.g., extruded, cast or sheet-rolled) or sintered depending on the metal selected.

The fifth layer can also be made of suitable monolithic materials, such as, for example, silicon nitride, aluminum nitride, graphite (e.g., isostatically pressed, cured sol-gel, or laminated resin depending on the material), which can be filled with refractory or thermally conductive particles. Also, the fifth layer can be made of suitable polymer-based resin materials, such as, for example, polyimide-based, epoxy-based, tetrafunctional-based, phenolic-based, carborane-siloxane-based, siloxane-based, and other highly cross-linked thermoset resins that can be filled with fibrous or particle materials to enhance strength (moduli) and dimensional stability (a-CTE).

The films can be applied as a liquid or solid, and then thermally cured (if needed) into smooth, rigid, intractable films or structural layers. The elastomeric composite layers can be applied in liquid form (e.g., molten thermoplastic) and cured. Thus, as shown, fiber optic web 200 can be disposed within a multilayer thin or thick film microelectronic device (e.g., composed of layers 202*a*-202*e*). Additionally, for this example embodiment, the input and output portions of the optical fiber conductor disposed within layer 202*a* are connected to a respective input and output connection of a suitable fiber optic transceiver 204. Thus, transceiver 204 can couple the optical signal received from optoelectronic signal generator 116 to the input of the optical fiber conductor, and the optical signal at the output of the optical fiber conductor to the optical signal detector 114.

Figure 3:
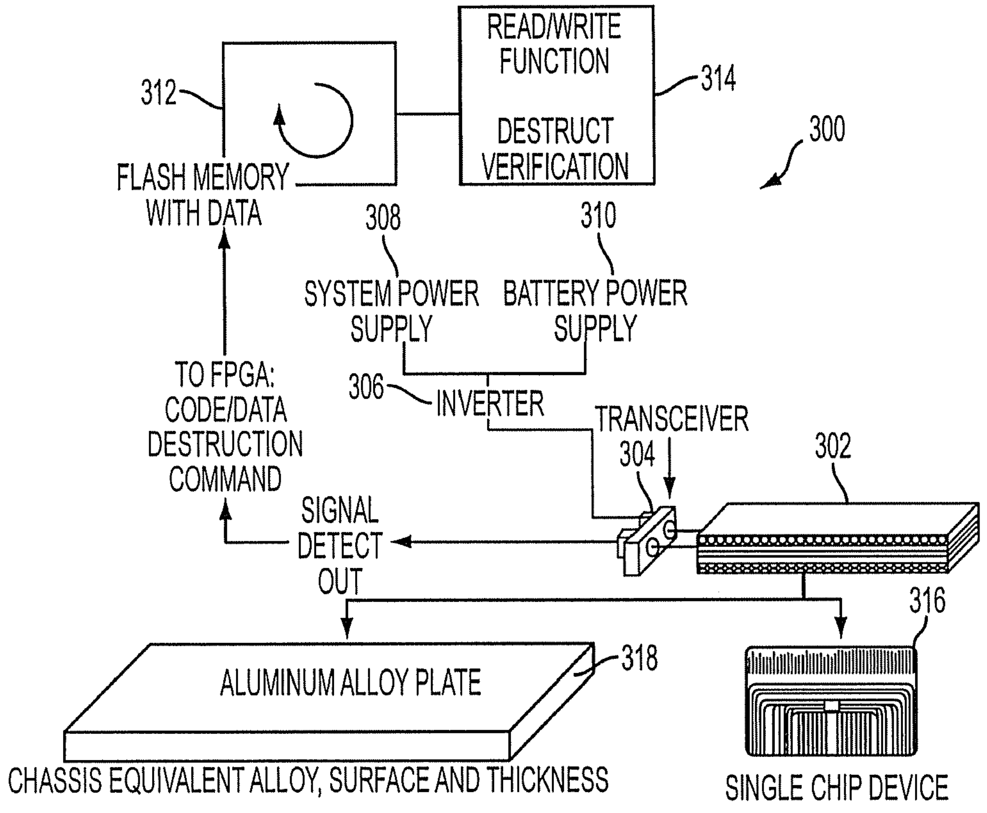
FIG. 3 depicts a functional block diagram of an example protective system that further illustrates the principles of the present invention.

FIG. 3 depicts a functional block diagram of an example protective system 300 that further illustrates the principles of the present invention. For this example embodiment, system 300 includes a thin film or thick film composition fiber optic web 302 coupled to a fiber optic transceiver 304. One of an external power supply 308 or internal power supply 310 is connected via a switch into a power conversion device 306, which provides an uninterruptible power source for system 300, so as to provide an optical signal to an input of fiber optic transceiver 304. For this example embodiment, transceiver 304 is a transmitter and receiver assembly that can be composed of a single monolithic component, or alternatively as an assembly of sub-components that can be collocated or dispersed in the system network. As such, for this embodiment, transceiver 304 couples the optical signal (if any) out of fiber optic web 302 to an optical signal detector. If no optical signal is detected, the detector forwards a coded data destruction command to a programmable logic device, which can initiate a process to erase or destroy data stored in a flash memory device 312. The programmable logic device can verify the validity of the data destruction command 314, before the programmable logic device initiates the data destruction process. As shown, fiber optic web 302 can be formed as a modular film on an assembly device 316, or disposed on an aluminum alloy plate 318 to form a wall of an enclosure (e.g., chassis wall) for an electronic system or component to be protected by system 300.

Figure 4:
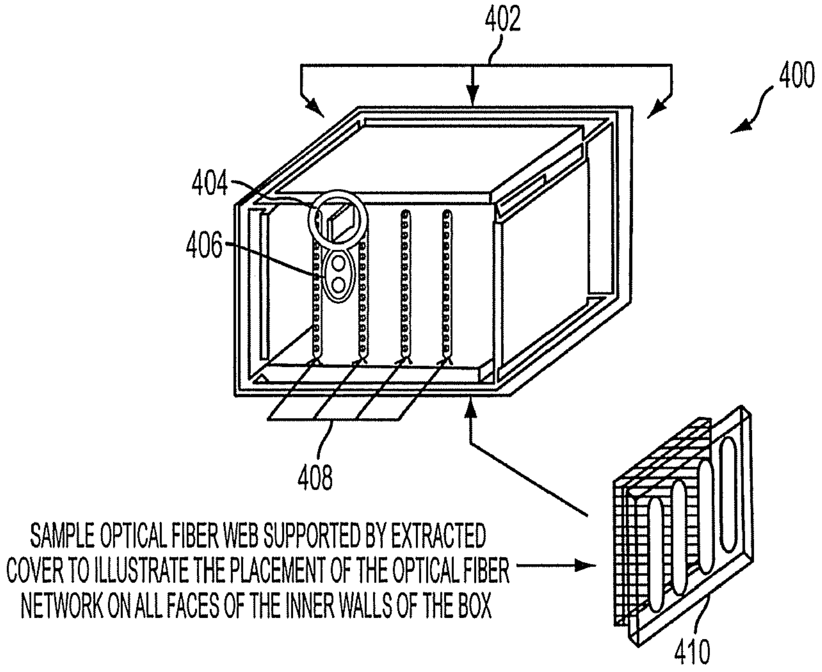
FIG. 4 depicts a pictorial representation of a cutaway, perspective view of an example enclosure, which illustrates a use of the present invention.

FIG. 4 depicts a pictorial representation of a cutaway, perspective view of an example enclosure 400, which illustrates a use of the present invention. For this example, enclosure 400 includes a plurality of walls 402 and a front cover 410. Notably, although only three walls 402 and a cover 410 are referenced in FIG. 4, in order for enclosure 400 to be completely protected against intrusion, enclosure 400 should include five walls 402 and cover 410. Thus, two of the five walls 402 of enclosure 400 are not explicitly shown. Each wall 402 and the front cover 410 contain a mounted fiber optic web. Also, for this example, a system to be protected by enclosure 400 is shown that includes a plurality of printed circuit boards 408. At least two of the printed circuit boards 408 include an FPGA 404 with instructions to overwrite critical code on one or more flash memory devices disposed in an enclosed system. Element 406 indicates locations within enclosure 400 where internal lithium or alternate batteries may be disposed. These batteries can be used to provide power for the optical signal components and FPGAs 404 contained within enclosure 400.

Figure 5A:
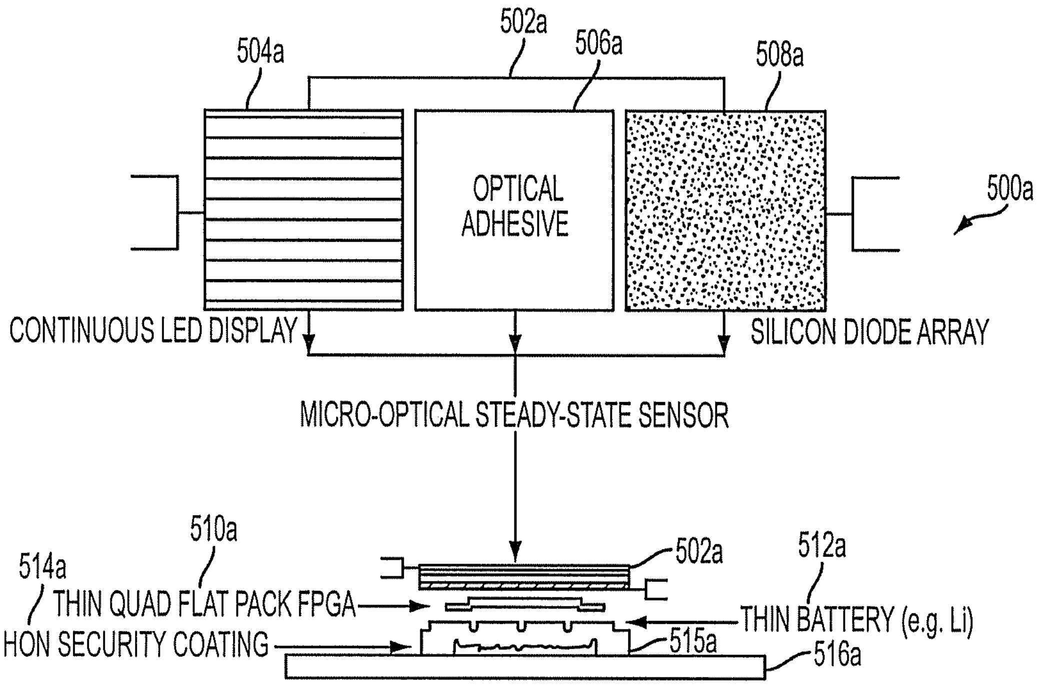
FIGS. 5A-5C are related diagrams that depict different stages of the construction of an example system for protecting an electronic circuit, in accordance with a second embodiment of the present invention.
Figure 5B:
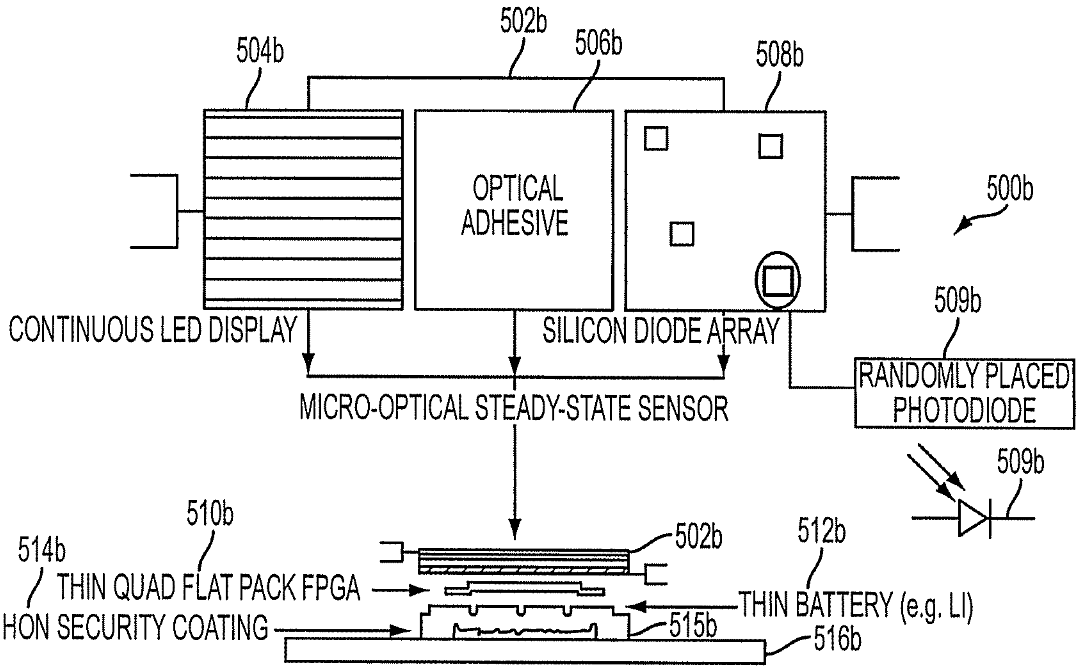
Figure 5C:
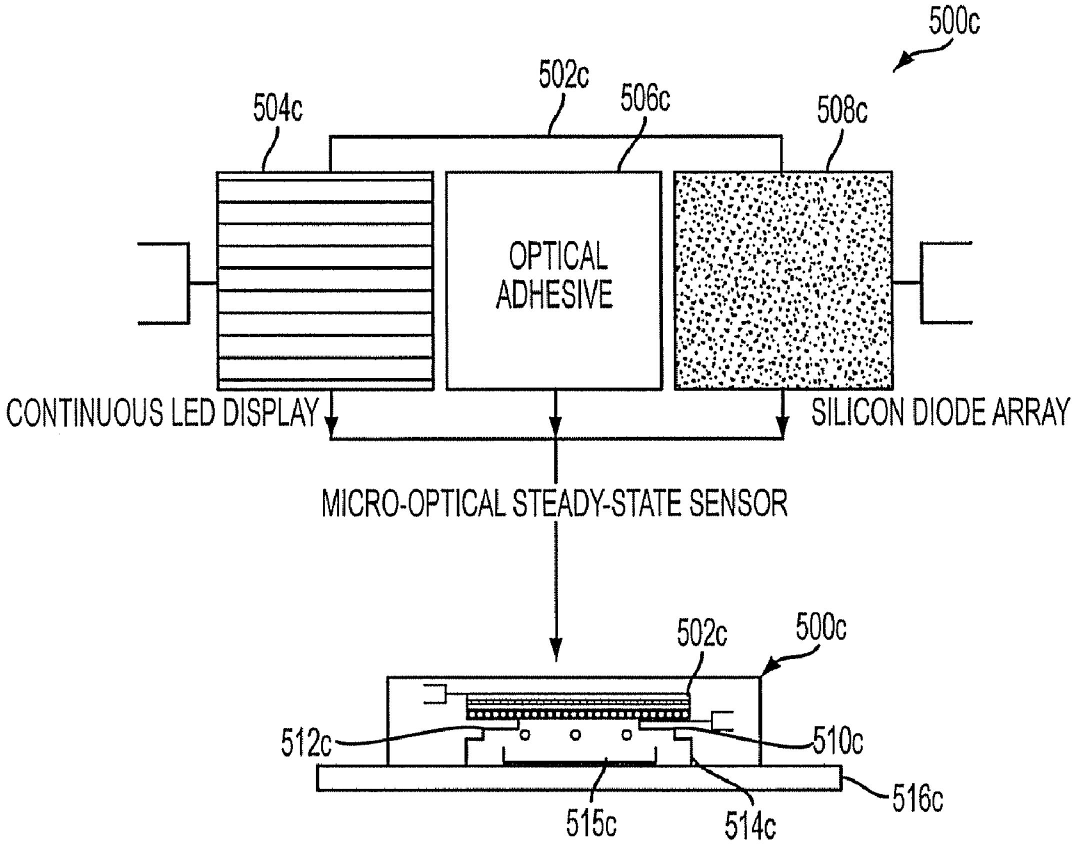

FIGS. 5A-5C are related diagrams that depict different stages of the construction of an example system 500*a*-500*c* for protecting an electronic circuit, in accordance with a second embodiment of the present invention. Referring to FIG. 5A, for this example embodiment, system 500*a* includes an optical signal protection network 502*a*. Protection network 502*a* includes a continuous LED display layer 504*a* arranged in an array form. The light emitting surface of LED display layer 504*a* is disposed on one surface of an optical adhesive layer 506*a*, and the second surface of optical adhesive layer 506*a* is disposed on the light receptor surface of a silicon diode array layer 508*a*. In one or more other embodiments, the diode array may be directly interfaced with the LED surface. Thus, for this example embodiment, the respective adhesive and optical properties of the optical adhesive layer 506*a* function to affix the light emitting surface of LED display layer 504*a* adjacent to the light receptor surface of silicon diode array layer 508*a*, so that the optical signals emanating from each LED device of LED display layer 504*a* are received by one or more of the optical signal receptors on the light receptor surface of silicon diode array layer 508*a*. The composite optical signal protection network 502*a* may be disposed on a surface of a programmable logic device (e.g., FPGA) 510*a*, and the combination of the composite optical signal protection network 502*a* and programmable logic device 510*a* may be disposed on a surface of a thin battery 512*a*. Network 502*a*, programmable logic device 510*a*, and battery 512*a* are covered with a suitable encapsulant 514*a* and disposed on a suitable circuit assembly 516*a* (e.g., similar to circuit 316 in FIG. 3).

Thus, in accordance with the present invention, system 500*a* is arranged so that a penetration of optical protection network 502*a* disturbs or interrupts the optical signal paths between the LED display layer 502*a* and the silicon diode array layer 508*a*. The programmable logic device 510*a* is coupled to the silicon diode array layer 508*a* and can determine whether or not the optical signal paths have been disturbed or interrupted. The battery 512*a* provides power for the destruction of sensitive data stored in a semiconductor device 515 disposed on the surface of the substrate or base 516*a*. Alternatively, an external power supply may be used to power the protective system 500*a*.

Referring to FIG. 5B, for this example embodiment, the structure of system 500*b* is substantially similar to the structure of system 500*a* in FIG. 5A and includes an optical protection network 502*b*, a programmable logic device 510*b*, and a thin battery 512*b* covered with a suitable encapsulant 514*b* and disposed on a suitable substrate or base material 516*b*. However, system 500*b* differs from system 500*a* to the extent that the silicon diode array layer 508*b* of system 500*b* includes a plurality of randomly located photodiodes (e.g., 509*b*) disposed on the optical signal receptor surface of the layer, instead of an array of silicon diodes as provided in layer 508*a* of FIG. 5A.

Referring now to FIG. 5C, for this example embodiment, the structure of system 500*c* is substantially similar to the structure of system 500*a* in FIG. 5A and includes an optical protection network 502*c*, a programmable logic device 510*c*, and a thin (or thin film thermal) battery 512*c* covered with a suitable encapsulant 514*c* and disposed on a suitable substrate or base material 516*c*. However, system 500*c* differs from system 500*a* to the extent that the layers and devices of system 500*c* are completely enclosed by an encapsulant. The encapsulant will resist penetration or removal by a number of physical and mechanical means.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A system for detecting an intrusion into an enclosure for electronic equipment or components, comprising:

an enclosure for electronic equipment or components;

at least one electronic circuit enclosed within said enclosure for electronic equipment or components;

at least one optical frequency signal conductor disposed between said enclosure for electronic equipment or components and said at least one electronic circuit, wherein said at least one optical frequency signal conductor is arranged in a pattern such that said at least one optical frequency signal conductor substantially encloses said at least one electronic circuit; and a first power source arranged internally in said system, said first power source comprising at least one of a coin battery and a super capacitor, said first power source operable to activate a second power source that is further operable to destroy data stored in a memory portion of said at least one electronic circuit in response to an intrusion into the enclosure.

2. The system of claim 1, further comprising:

means for generating an optical frequency signal coupled to an input for said at least one optical frequency signal conductor;

means for detecting said optical frequency signal coupled to an output for said at least one optical frequency signal generator; and means for reacting to an intrusion into said enclosure for electronic equipment or components coupled to at least said means for detecting said optical frequency signal.

3. The system of claim 1, wherein said at least one optical frequency signal conductor comprises at least one fiber optic strand.

4. The system of claim 1, wherein said enclosure comprises at least one wall of a chassis for electronic equipment or components.

5. The system of claim 1, wherein said enclosure comprises an encapsulant.

6. The system of claim 1, wherein said pattern comprises a plurality of coils.

7. The system of claim 1, wherein said pattern comprises at least one of a web pattern, a weave pattern, or a mesh pattern.

8. The system of claim 1, wherein said at least one electronic circuit further comprises at least one electronic circuit disposed on a printed circuit board.

9. The system of claim 1, wherein said at least one electronic circuit further comprises an integrated circuit.

10. A system for detecting an intrusion into an enclosure for electronic equipment or components, comprising:

an enclosure for electronic equipment or components;

at least one electronic circuit enclosed within said enclosure for electronic equipment or components;

at least one optical frequency signal conductor disposed between said enclosure for electronic equipment or components and said at least one electronic circuit, wherein said at least one optical frequency signal conductor is arranged in a pattern such that said at least one optical frequency signal conductor substantially encloses said at least one electronic circuit;

a laser transmitter coupled to an input for said at least one optical frequency signal conductor;

a laser signal detector coupled to an output for said at least one optical frequency signal generator; and a programmable logic circuit coupled to at least said laser signal detector, said programmable logic circuit operable to:

receive a detection indication signal from said laser signal detector; and if said received detection indication signal is interrupted, activate a data destruction circuit associated with said at least one electronic circuit.

11. The system of claim 10, wherein said at least one optical frequency signal conductor comprises at least one fiber optic strand.

12. The system of claim 10, wherein said enclosure comprises at least one wall of a chassis for electronic equipment or components.

13. The system of claim 10, wherein said electronic circuit comprises an integrated circuit.

14. The system of claim 10, wherein said pattern comprises at least one of a web pattern, a weave pattern, or a mesh pattern.

15. The system of claim 10, wherein said pattern comprises a plurality of coils.

16. A system for detecting an intrusion into an enclosure for electronic equipment or components, comprising:

an enclosure for electronic equipment or components;

at least one electronic circuit enclosed within said enclosure for electronic equipment or components;

at least one optical frequency signal conductor disposed between said enclosure for electronic equipment or components and said at least one electronic circuit, wherein said at least one optical frequency signal conductor is arranged in a pattern such that said at least one optical frequency signal conductor substantially encloses said at least one electronic circuit;

means for monitoring a power condition of said system; and means for generating power for an operation of said system if said means for monitoring said power condition determines that a power level for an ‘operation of said system is less than a predetermined value.

17. The system of claim 16, wherein said at least one optical frequency signal conductor comprises at least one fiber optic strand.

18. The system of claim 16, wherein said enclosure comprises at least one wall of a chassis for electronic equipment or components.

19. The system of claim 16, wherein said electronic circuit comprises an integrated circuit.

20. The system of claim 16, wherein said pattern comprises at least one of a web pattern, a weave pattern, or a mesh pattern.

* * * * *